United States Patent [19]

Kester et al.

[11] Patent Number: 5,557,699

[45] Date of Patent: Sep. 17, 1996

[54] NLO WAVEGUIDE "AND" SWITCH AND METHOD THEREFOR

[75] Inventors: John J. Kester; Iyad A. Dajani; Peter M. Ranon, all of Colorado Springs, Colo.; Thomas G. Alley, Albuquerque, N.M.

[73] Assignee: The United States of America as represented by the Secretary of the Air Force, Washington, D.C.

[21] Appl. No.: 498,705

[22] Filed: Jun. 30, 1995

[51] Int. Cl.⁶ .................................................. G02F 1/37
[52] U.S. Cl. .................. 385/122; 359/328; 359/332; 385/16; 385/28; 385/37
[58] Field of Search .................. 385/1, 4, 5, 10, 385/15–17, 27, 28, 37, 122, 123, 141; 359/326, 328, 332

[56] References Cited

U.S. PATENT DOCUMENTS

| 5,040,864 | 8/1991 | Hong | 385/16 |
| 5,253,258 | 10/1993 | Lawandy | 385/122 X |
| 5,493,628 | 2/1996 | Lawandy | 385/122 |

*Primary Examiner*—John D. Lee
*Attorney, Agent, or Firm*—Thomas C. Stover

[57] ABSTRACT

Method and apparatus are provided for NLO switching by first providing a phase-matched SHG grating which outputs a reinforced SHG beam only when two input beams of frequency ($\omega$) are present in two modes of such wg. The so encoded NLO switch is operated by directing at least two input pulsed laser beams of frequency ($\omega$) into the two modes of the wg to generate a reinforced pulsed output SHG beam and output same from the wg in an NLO switching process. The two input beams desirably have a separate pulse train and the spatial and temporal overlap of the input beams are adjusted such that at least some of the pulses of each pulse train sufficiently overlap to generate and output reinforced SHG pulse signals and thus output an on-off data signal. A detector then reads and processes the output signals. Such NLO switch will allow integrated circuitry to operate at faster rates and to allow, eg. aircraft to communicate, switch, compute, sense, display and respond much faster than state-of-the-art circuitry based on electronics switching.

26 Claims, 5 Drawing Sheets

AN EMBODIMENT OF THIS INVENTION

FIG. 1

OPTICAL MODIFICATION SETUP

FIG. 2

OPTICAL SWITCH TESTING SETUP

LOW INTENSITY SHG

FIG. 7

LOW INTENSITY SHG

FIG. 8

HIGH INTENSITY SHG WITH BEAM COMBINATION

WAVEGUIDE ON BEAM COUPLING APPARATUS

FIBEROPTIC SWITCH CONFIGURATION

FIG. 12

NLO WAVEGUIDE "AND" SWITCH AND METHOD THEREFOR

STATEMENT OF GOVERNMENT INTEREST

The invention described herein may be manufactured and used by or for the Government for governmental purposes without the payment of any royalty thereon.

COPENDING APPLICATIONS

Also see our copending Applications Ser. No. 08/498,706 entitled NLO WAVEGUIDE "OR" SWITCH AND METHOD THEREFOR filed herewith on Jun. 30, 1995.

BACKGROUND OF THE INVENTION

1. Field of the Invention

This invention relates to a method for and/or optical switching in a waveguide, particularly as activated by non-linear optical signals and the optical switch so employed.

2. The Prior Art

Nonlinear optical processes have been the basis for many types of information processing. A component of these nonlinear optical processes is known as second harmonic generation (SHG). SHG has been observed in crystalline and oriented materials for over 30 years. Numerous geometries have been predicted and tested. Two features must be present in a material for efficient SHG production. These are a nonlinear susceptibility which produces the SHG and phase matching which allows the SHG that is produced from one region of the material to be in phase with the SHG that is produced with other regions of the material. If there is no phase matching a small amount of SHG can be observed from a material but most of the SHG light is destroyed by interference of SHG light from one region with another. So only with phase matching will all the peaks and valleys of the SHG fields produced in different regions line up and give efficient output signals.

Nonlinear optical signals can be produced in crystalline or poled waveguide materials. This is allowed because these materials can be manufactured so that they have the two key features of nonlinear susceptibility and phase matching. These crystalline and poled materials can have a nonlinear susceptibility which is uniform along the waveguide path. In this situation SHG can be phase-matched only by a change in the order of the waveguide mode and possibly the polarization. When the fundamental beam propagates in another mode it may produce some SHG but it will not be phase-matched and therefore the output will be small.

Another type of material can have a nonlinear susceptibility but initially no phase-matching capability. This material can be made into an efficient NLO material by periodically modifying the material along the waveguiding dimension so that phase matching can occur. One way to achieve this modification is a periodic modulation of the nonlinear susceptibility along the direction of propagation. Periodic modulation can occur in crystals, poled materials and in optically modified materials. Optically modified materials can have an intrinsic NLO activity or the NLO activity can be optically induced.

Also in the prior art is U.S. Pat. No. 5,253,258 to Lawandy (1993) which discloses an optically encoded phased-matched SHG waveguide made of certain doped glasses and capable of self-frequency doubling of an input beam. However, there is no indication of employing two modes in the same waveguide for optical switching purposes.

The theory of frequency doubling of laser beams in certain channel waveguides is discussed at length in *Frequency doubling in Ti:MqO:LiNbO₃ channel waveguides* by F. Laurell, J. Opt. Soc. Am. B/Vol. 5, No. 2 Feb. 1988, which Article is incorporated herein by reference.

Again while frequency doubling in certain waveguides is disclosed, there is no indication of employing two modes in the same waveguide for optical switching purposes.

Also one device used for the interference of optical signals is called a Mach Zender interferometer. In this device a laser beam that is propagating in a confined waveguide such as a fiber or channel waveguide on an integrated circuit, is split into two channels. One of the channels is modified by an external device that changes the propagation time down the channels. When the two beams are then recombined they destructively interfere if one of the beams has its phase shifted by 180 degrees related to the other beam. This is an electro-optic switch. However, laser beams in waveguides are very sensitive to temperature changes and a slight temperature difference between the channels can distort the phase shift between such beams and reduce the interference therebetween, once recombined, and cause inaccuracies in the above electro-optic switch. Also is indicated, the Mach Zender interferometer requires two channels and thus added space.

Thus there is a need and market for an optical switch that reduces or obviates the above prior art shortcomings.

There has now been discovered a waveguide all optical switch wherein a pair of pulsed, laser beams are coupled into a waveguide to output a strong SHG beam in contrast with inputting but one of the laser beams into such waveguide, which outputs a weak SHG beam, to provide an on-off optical switch per the invention. As the invention requires but one waveguide (having two or more modes therein,) it is more compact and takes less space than the Mach Zender interferometer which requires two waveguides. Also as two modes in the same waveguide can be maintained at/or near the same temperature, the optical switch of the invention has higher accuracy and reliability then previously available.

SUMMARY OF THE INVENTION

Broadly the present invention provides an NLO switch comprising:

a) a waveguide (wg), the wg having at least two waveguiding modes at a fundamental frequency $\omega$, one waveguiding mode at a second harmonic frequency $2\omega$ and at least one encoded grating for phase-matched SHG, b) means for directing at least two input pulsed laser beams of the same frequency $\omega$ into two of the modes to generate an SHG beam when the encoded grating period compensates for the wavevector mismatch between the combined fundamental beams and the generated second harmonic beam.

The invention further provides a method for encoding an NLO switch comprising:

a) directing at least two input pulsed laser beams of the same frequency ($\omega$) into at least two modes of a waveguide (wg) and b) concurrently directing a pulsed input beam of a second harmonic frequency ($2\omega$), into one of the two modes or into a third mode of said wg, all beams being in temporal overlap, to form at least one phase-matched grating
which produces a significant output SHG beam only when both beams of frequency (ω) are present in two modes of the wg.

The invention also provides a method for operating the above so encoded NLO switch of the above method of the invention comprising, directing at least two input pulsed laser beams of the same frequency into two modes of a waveguide (wg) to generate a strong pulsed output SHG beam from such wg in an NLO switching process.

Definitions

In free space the wavevector is defined as two times pi divided by the wavelength of the beam The wavevector mismatch is the difference between the wavevector of the second harmonic and the sum of the wavevectors of the fundamental beams in the different waveguide modes, eg, 1 and 2.

$$\Delta k = k_{2\omega} - (k_{\omega,1} + k_{\omega,2})$$

The combined fundamental beams am electromagnetic waves which have a wavevector equal to half the sum of their component wavevectors $$k_{comb} = \frac{k_{\omega,1} + k_{\omega,2}}{2}$$

By "weak" SHG signal as used herein is meant one that will not be detected by a sensor or is so small that it does not trigger a response in a switching apparatus. In contrast a "strong" SHG signal is one that can be so detected and is large enough that it does trigger a response in a switching apparatus. It has been found that the strong SHG signals are 10 to 60 times as intense as the weak ones and often 40 to 60 times as intense.

"The waveguide" (wg) referred to herein can be a planar wg or a channel wg. Both types of wgs are in a film and confined by the upper and lower surfaces thereof. The channel wg is also bounded by refractive sidewalls to narrow the optical path or channel in the film, which can have, e.g. a rectangular cross-section. The planar wg does not have such sidewalls and the light transmitted therein can laterally diffuse.

The optical fiber referred to herein is related to the channel waveguide but is of rounded cross-section, often made of glass and is long and thin. Light is confined in two dimensions such that its prominent propagation path is along the fiber axis. The peripheral boundary of the fiber that restricts the light propagation to the axial direction thereof, is an outer cladding made of lower index or refraction that surrounds the fiber core, which is made of, e.g. glass of higher index of refraction.

BRIEF DESCRIPTION OF THE DRAWINGS

The invention will become more apparent from the following detailed specification and drawings in which.

DESCRIPTION OF PREFERRED EMBODIMENTS

Figure 1:
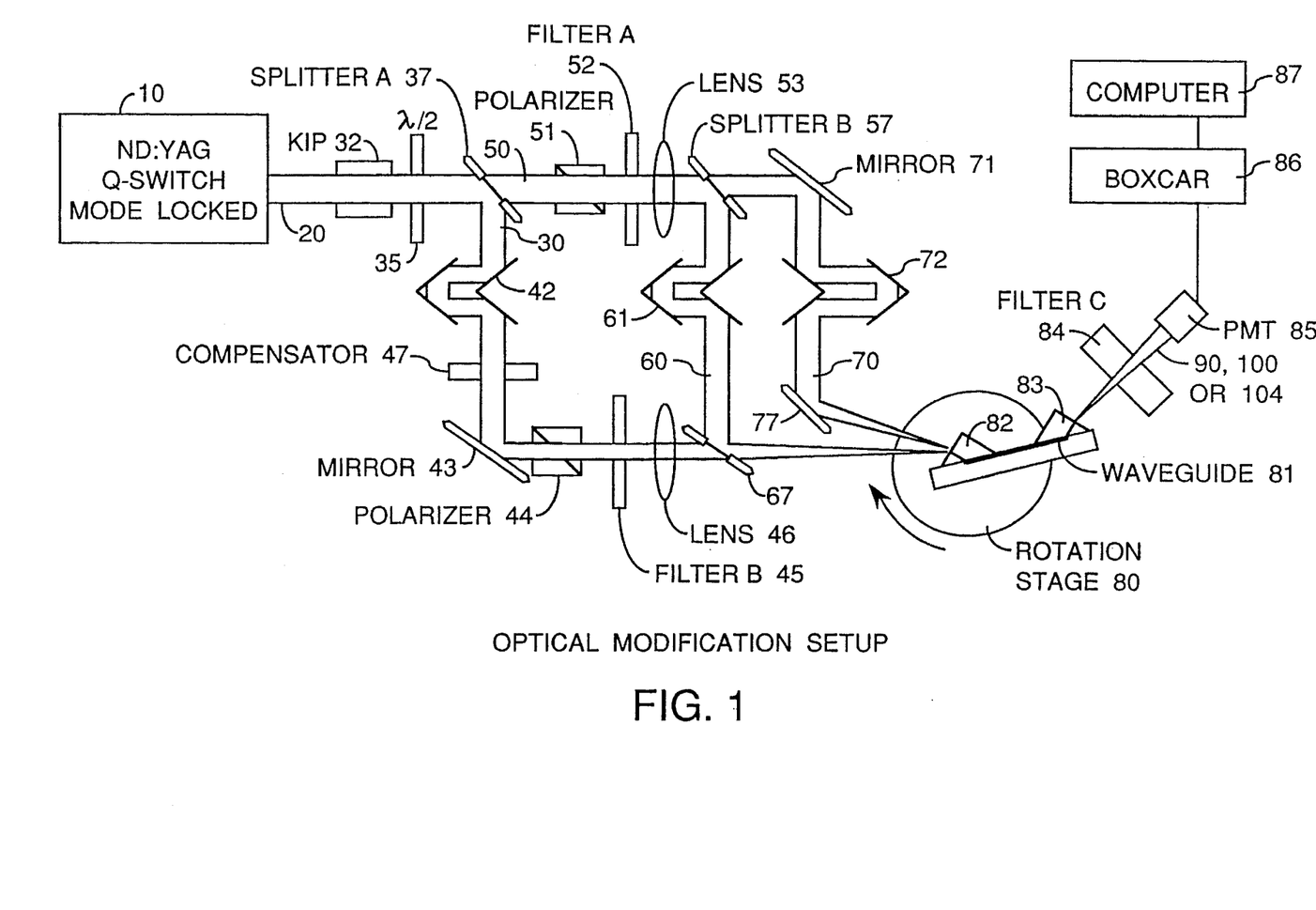
FIG. 1 is an elevation schematic view of an apparatus for optical modification of a waveguide according to the present invention.

Referring in more detail to the drawings, laser beam source 10 outputs laser beam 20 as shown in FIG. 1. A preferred laser source 10 is a mode-locked and Q-switched Nd:YAG laser, but other lasers, wavelengths and pulse lengths which are suitable include, diode lasers, Ti-Sapphire lasers and ion lasers. Laser 10 produces pulses of light at 1.064 µm wavelength. Other wavelengths which are suitable include the transmission region of silica based glases, from 200 to 2500 nm. The use of other waveguide materials allows the use of wavelengths within their transmission region, eg. from 200 to 8000 nm. A preferred laser source is a mode-locked laser which produces mode locked pulses, each having a pulse width of 120–200 picoseconds and a repetition rate of, eg. 76 MHz but other pulse widths, eg. of less than 100 femtoseconds and other repetition rates, can be employed per the invention. The pulse repetition rate can be 1 mHz to 100 teraHz or more and preferably is 1 Hz to 1 GHz.

The Q-switched pulses are 250 nanoseconds in length. Within each Q-switched pulse envelope is a series of mode-locked pulses, each having a width of 120–200 picoseconds and a repetition rate of 76 megahertz.

The fundamental beam 20 issuing from laser 10 is modified by a KDP crystal 32 which doubles the frequency of laser beam 20. The doubled frequency beam 30 and fundamental beam 20 initially travel along the same path through a half wave plate (λ/2) 35 to rotate the polarization of the beams. The doubled frequency beam 30 and fundamental beam 20 are separated by a beam splitting mirror (BSM) 37. The doubled frequency beam 30 travels through a delay line 42 which can be adjusted in length to synchronize the mode-locked pulses within the waveguide 81. Beam 30 is then directed through a compensator 47 which can slightly advance or retard the phase of beam 30. The beam 30 is reflected from mirror 43 and directed through a polarizer 44, adjusted to produce transverse magnetic waves within the waveguide 81. The beam 30 is directed through a filter 45 to remove any fundamental beam 30 which was reflected by BSM 37. The beam 30 is then focused by lens 46 so that the focal point is near the entrance prism 82. The beam 30 can pass through a mirror 67 depending on the optical input requirements for the waveguide 81.

The fundamental beam 20 that is not converted to the doubled frequency beam 30 is transmitted through the BSM 37 and becomes beam 50. Beam 50 is polarized by element 51 to produce transverse magnetic light in the waveguide 81. The beam is directed through filter 52 to remove any frequency doubled light 30 that was transmitted through BSM 37. Beam 50 is then directed through lens 53. Beam 50 is then divided by BSM 57 so that approximately 50% of the light is reflected or transmitted. The reflected beam 60 is directed through a beam delay line 61 to synchronize the mode-locked pulses with the waveguide 81. Beam 60 is reflected from mirror 67 and directed toward the input prism 82.

The portion of beam 50 that is transmitted, beam 70, by BSM 57 is reflected from mirror 71. Beam 70 is directed through a beam delay line 72 to synchronize the mode-locked pulses with the waveguide 81. Beam 60 is then reflected from mirror 77 and directed towards the input prism 82.

Beam 30, Beam 60, and Beam 70 are coupled in the waveguide 81 by a prism coupler 82. The entire waveguide 81 and couplers 82 and 83 can be rotated to allow for optimal coupling of one of the input beams. The remaining input beams are directed by the movement of mirrors in their respective arms to produce optimal coupling into appropriate waveguide modes. Each beam travels a specific path in the waveguide depending on its wavelength and the mode into which it is coupled. The delay lines, 42, 61, and 72, in each beam path arm are adjusted to give temporal overlap of the mode-locked pulses to within less than 10 picoseconds as shown in FIGS. 3–6. The beams are also aligned to produce good spatial overlap of the pulses within the waveguide 81. Typically, the lower order modes are used to modify the waveguide. Beam 30 is coupled into the lowest order mode (zeroth order mode). Beam 60 and Beam 70 can be coupled into the lowest and next lowest modes (zeroth and first order mode) depending on the angle of entry.

The light produced within the film is also a frequency doubled beam 90, 100, or 104. These beams arise from the input beams 60, 70, or a combination of beams 60 and 70, respectively. The light exiting the waveguide is filtered by filter 84, to reflect or reject any of the fundamental beams 60 or 70. Beam 90, 100, or 104 is detected by a photomultiplier (PMT) 85. The signal from the photomultiplier 85 is averaged by a boxcar averager 86 and the averaged signal is collected by a computer 87.

The waveguide 81 was modified to allow phase matching for a specific combination of modes being propagated in the waveguide. To produce a gate with an "AND" configuration the following procedure is carried out. Waveguide 81 is modified by a combination of beams 30, 60 and 70. The level of modification can be determined by blocking the second harmonic and then successive blocking either one or neither fundamental beam. When a sufficient level of intensity of the appropriate beams is produced (for facile detection) then the modification is complete.

Figure 10:
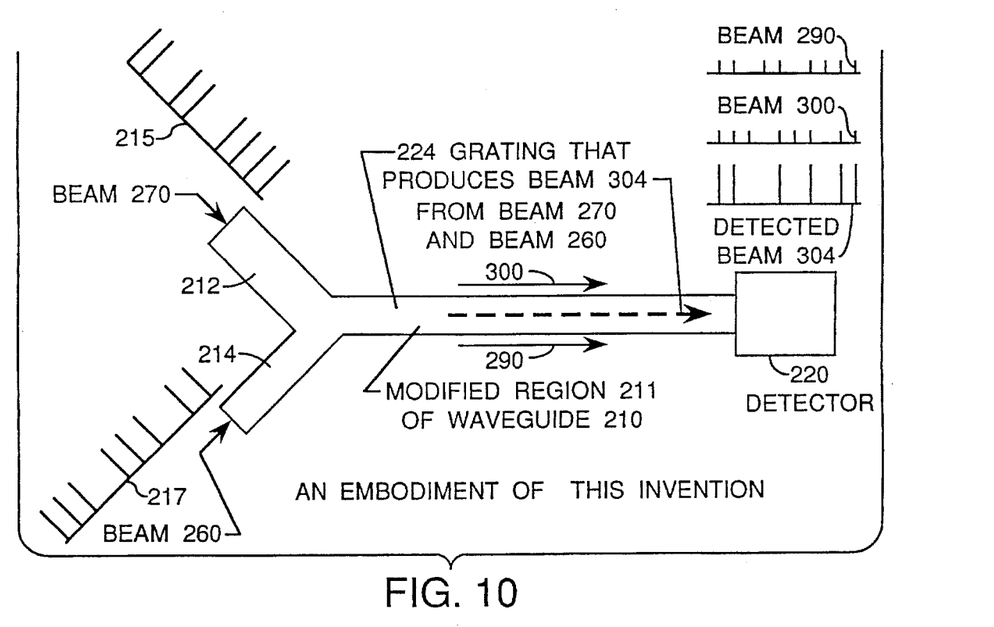
FIG. 10 is a fragmentary elevation schematic view of another waveguide and optical switch embodying the present invention.

The level of modification that is required will depend on the specific optical switch that is required. Thus an integrated photodetector can be built into the waveguide to detect the presence of switching behavior, as shown in FIG. 10.

Figure 2:
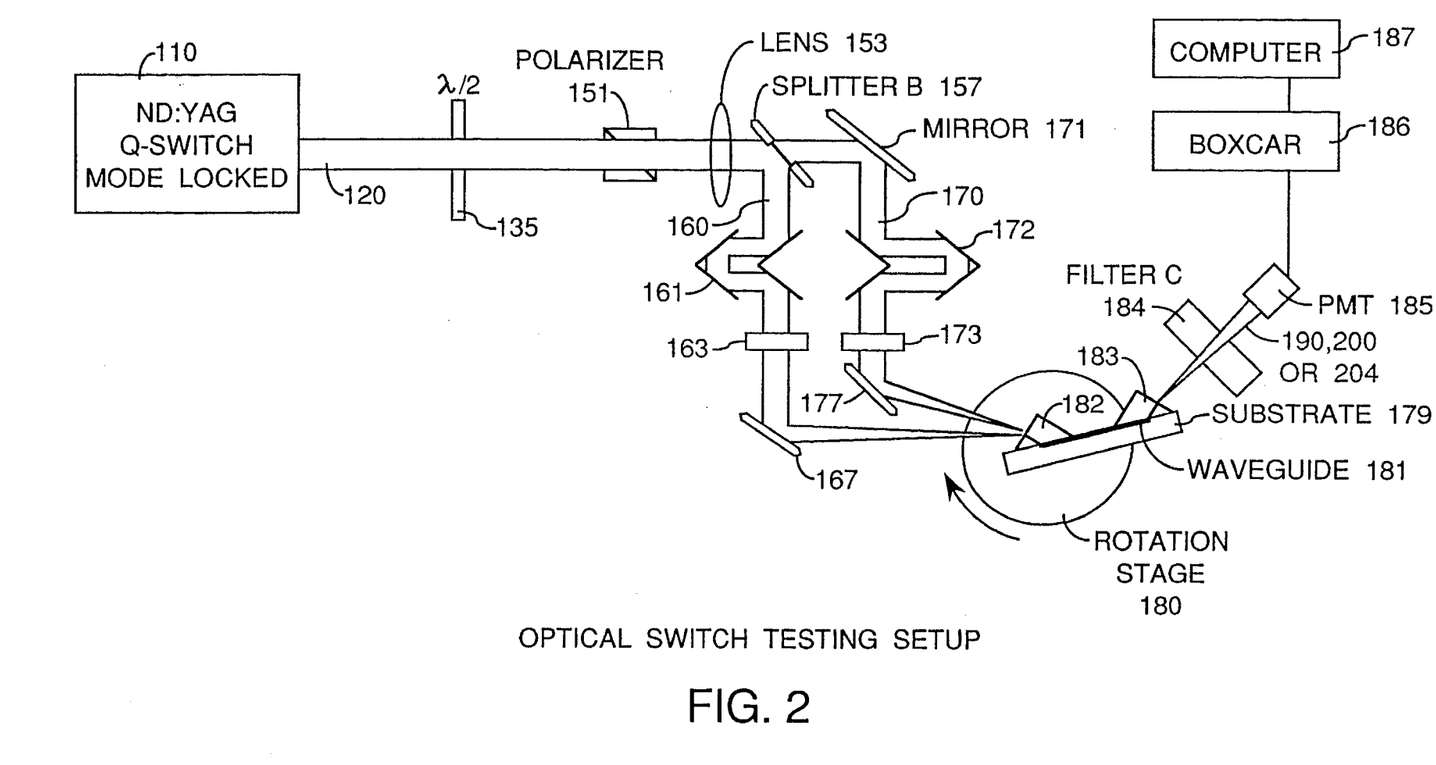
FIG. 2 is an elevation schematic view of an apparatus for testing or operating the waveguide of FIG. 1 as an optical switch.
Figure 3:
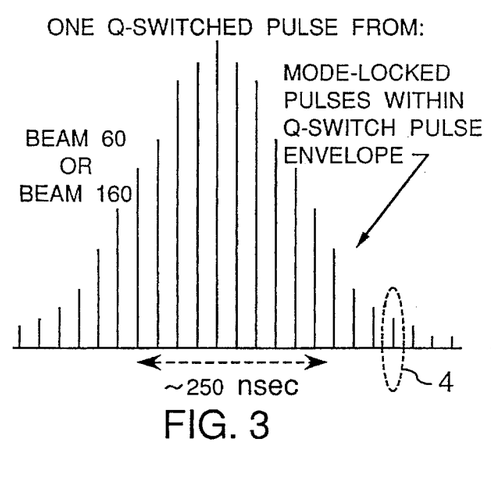
FIGS. 3 and 5 are fragmentary schematic elevation views of laser beam pulses employed in the waveguide and optical switch embodying the present invention.
Figure 4:
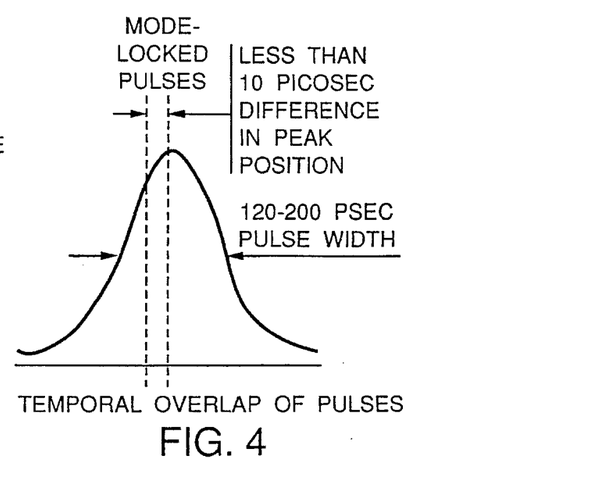
FIGS. 4 and 6 are each enlarged fragmentary schematic elevation views of a sample pulse of the pulse train shown respectively in FIGS. 3 and 5.
Figure 5:
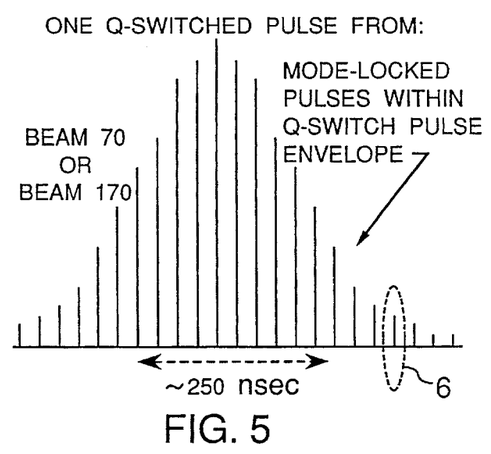
Figure 6:
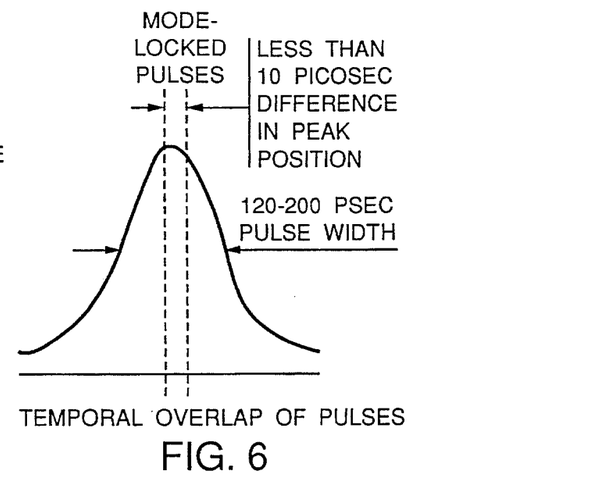
Figure 11:
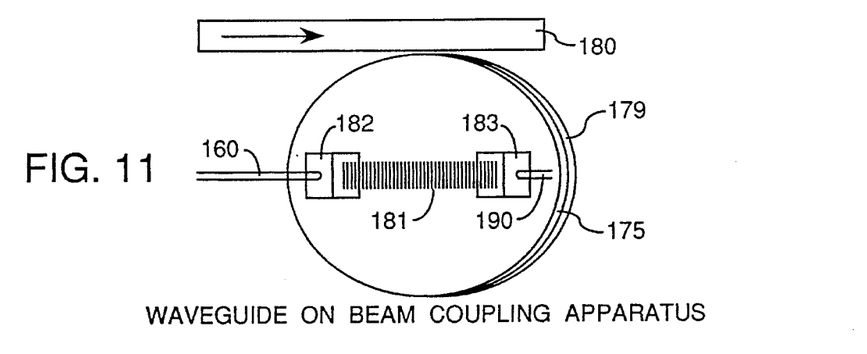
FIG. 11 is a schematic plan view of a component of the apparatus of FIG. 2.

The so encoded waveguide is employed in an optical switch embodying the invention wherein laser 110 outputs laser beam 120 as shown in FIGS. 2 and 11 and described below. A preferred laser 110 is a mode-locked and a Q-switched Nd:YAG laser, but other lasers and wavelengths acceptable include, diode lasers, Ti-Sapphire lasers, and ion lasers. Laser 110 produces pulses of light at 1.064 μm wavelength. The Q-switched pulses are 250 nanoseconds in length. Within each Q-switched pulse envelope is a series of mode-locked pulses, each having a width of 120–200 pico seconds and a repetition rate of 76 megahertz.

The optical switch of the invention is tested and operated as shown in FIG. 2, wherein a fundamental beam 120 issuing from the laser 110 is directed at a half wave plate (λ/2) 135 to change the polarization of the beam 120. The beam 120 is polarized by element 151 to produce substantially transverse magnetic waves in the waveguide 181. The beam 120 is then directed through a lens 153 to produce a focused beam at the input prism 182. The beam 120 is split by a beam splitter 157 into two approximately equal intensity beams, 160 and 170. Each beam 160 and 170, is directed through a delay line 161 and 172, respectively, to allow for temporal overlap of the pulses of the beams in the waveguide 181. Each beam (160 and 170) is then reflected by a mirror and directed into the input prism coupler 182 as shown in FIGS. 2 and 11.

The waveguide 181 in film 175 and prisms 182 and 183 on substrate 179, can be rotated, on rotor 180, to allow coupling of one of the beams into the waveguide, e.g. beam 160, as indicated in FIGS. 2 and 11. Then the other beam is coupled into the waveguide 181 by movement of the reflecting mirrors, 171 and 177 or 167 and 157.

The "AND" gate configuration is tested according to the following procedure, with reference to FIG. 2. When neither beam 170 or 160 is on, then no light is detected by the PMT 185. When beam 160 is coupled into the waveguide then only a small amount of a frequency doubled beam 190 is generated. When beam 170 is coupled into the waveguide then a small amount of frequency doubled beam 200 is generated and detected by PMT 185. Beams 190 and 200 are generated in the same waveguiding mode because the same frequency doubled beam 30 in FIG. 1, was used to modify the waveguide and its mode was not changed during the modification. The low intensity levels of beam 190 and 200, are below the levels (or threshold) needed to trigger a response in electronics, eg. an optical switching sensor, following, eg. the photomultiplier 185 or photodetector 220.

However, when both of the beams 160 and 170 are coupled into the waveguide in spatial and temporal overlap, pulses of the frequency doubled beam 204 are produced. The intensity of beam 204 is a minimum of 10 times the intensity of either beam 190 or 200. The intensity of beam 204 is above the level needed to trigger a response in the above electronics. An optimized detection will cause phase-matching identical to the modification conditions. For example, to enhance the above phase-matching, compensators 163 and 173 are employed in the circuit of FIG. 2 and are adjusted respectively in beams 160 and 170, to allow for maximum phase-matching.

Figure 7:
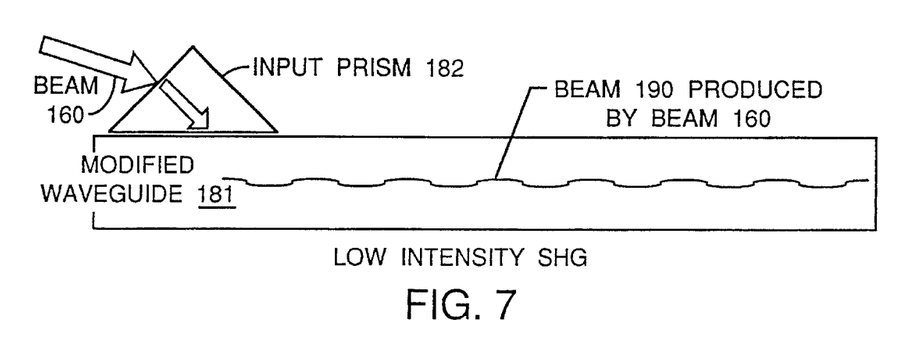
FIGS. 7, 8 and 9 are fragmentary schematic elevation views of input pulse beams and generated resultant SHG beams in a waveguide embodying the present invention.
Figure 8:
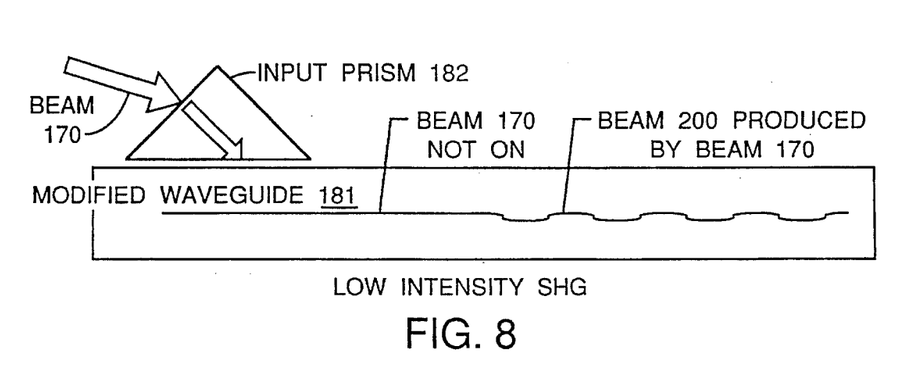
Figure 9:
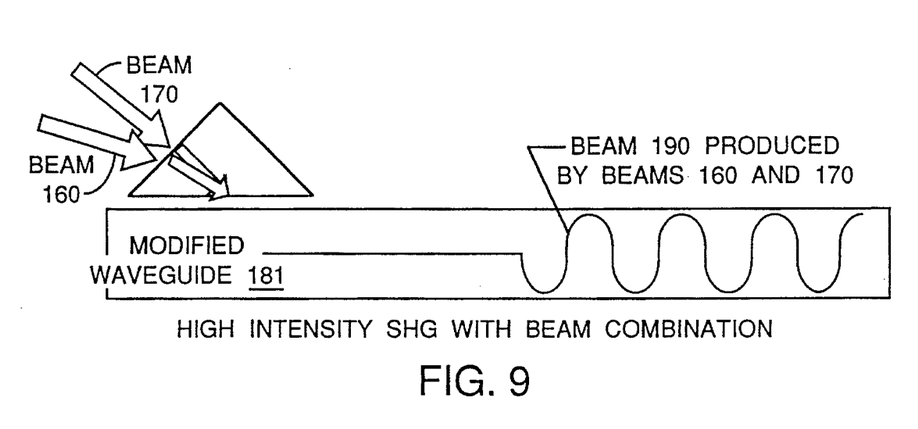

A summary of the above tests is shown in Table 1 and corresponds to an exclusive "AND" gate. The second and fourth sets of data in Table 1 are indicated in FIGS. 7, 8 and 9.

TABLE 1

| "AND" Logic Gate Configuration | | |
| --- | --- | --- |
| BEAM 160 | BEAM 170 | Beam 204 |
| 0 | 0 | 0 |
| 1 | 0 | 0 |
| 0 | 1 | 0 |
| 1 | 1 | 1 |

Another embodiment of this invention is shown in FIG. 10. Such embodiment is for an optical switch which has been manufactured for use with an integrated circuit. The modified waveguide is a channel waveguide 210 which lies in the plane of FIG. 10. The channels 212 and 214 in the waveguide 210, are illustrated in FIG. 10 as having a "Y" configuration with beams 260 and 270 entering said channels as shown. Beams 260 and 270 are a series of pulses of equal height. Beams 260 and 270 join and co-propagate into a single channel 211 (in spatial and temporal overlap) to generate SHG beam 304, in a manner similar to the embodiments discussed above. Note that beams 260 and 270, separately can only generate a weak or undetectable beam 290 or 300 in the waveguide region 211.

The intensities of the SHG beam generated in the channel 211 will depend on the logic gate for which the waveguide has been modified. In the example of the "AND" gate discussed above. Table 1 can also indicate the results of the interaction of beams 260, 270, and 304 by comparing (or substituting) them with beams 160, 170, and 204 respectively, in such Table.

In sum in the "AND" gate configuration, the presence of both input beams 260 and 270 will produce a substantial signal at detector 220 which converts beams over a certain threshold to an electrical signal. When either beams 260 or 270 propagate alone or are not simultaneously then the signals 290 or 300 are not substantial enough to exceed a threshold in detector 220 to indicate that a signal is present. When some of the pulses are not overlapped, substantial phase matching does not occur with the modified waveguide and no signal is detected.

In another embodiment of the invention, the waveguide of FIG. 10 is combined with another waveguide (not shown) to form a subsequent switch.

Figure 12:
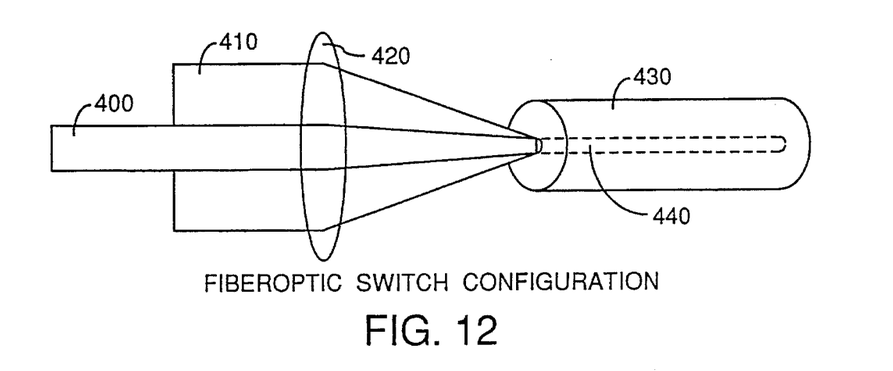
FIG. 12 is a fragmentary elevation schematic perspective view of an optical component to be used in place of the waveguides shown respectively in FIGS. 1, 2, and 11.

Another embodiment of this invention is shown in FIG. 12. Such embodiment is for an optical switch which has been manufactured in a fiber optic waveguide. The modified fiber is composed of a fiber optic core 440 and a cladding 430. Fibers can be bundled into a group of fibers which are enclosed in a jacket (not shown). The fiber core can be made of any materials suitable for waveguiding and supporting the grating modification. The fundamental frequency optical beams 400 and 410 are coupled into the core 440 of the fiber optic waveguide by focusing a laser beam with a converging lens system 420. The lens system 420 can be a single lens or a number of lenses to properly converge the light. The beams 400 and 410 are coupled into different waveguiding modes of the fiber by using beams of different geometric cross-section and size. For example, beam 400 may be coupled in to the lowest order fiber mode $LP_{01}$ and beam 410 may be coupled into the next higher angularly symmetric mode $LP_{02}$. The size and shape of the cross section of these beams will depend on the particular modes that are excited.

The operation of the switch occurs in the same manner as for the planar or channel waveguide. For the operation of the "AND" gate, a fiber is modified by simultaneous illumination of the fiber by beams 400 and 410 and by a frequency doubled beam (not shown). After modification when either beam 410 for 400 alone are propagated in the fiber, only a small amount of light is observed. When both 400 and 410 are allowed to propagate, a strong frequency doubled beam is observed at the output of the fiber.

Other methods exist for modifying a channel waveguide. These methods include the poling of the region of the waveguide to be modified. Poling of the waveguide includes the application of an electric field which has a specific spatial dependence down the waveguide to produce the correct modification. The correct modification will depend on the type of optical switch and mode combination that is optimal for this type of monotonic modification in the transverse direction.

The electric fields are applied to the waveguide at elevated temperatures, typically between 180°–200° C. The waveguide is then cooled with the electric field applied. When the waveguide is returned to room temperature the electric fields are removed and the waveguide is said to be "poled". Bulk glasses and single crystals have been poled to produce nonlinear optical signals. For a further discussion of poled waveguides see an Article by E. J. Lim et al in *Electronics Letters*, Vol. 25, No. 3, Pg 174 (1989), incorporated herein by reference.

Another method to modify the waveguide is to irradiate the waveguide with beams of electromagnetic radiation or particles. The particles can be electrons, or neutral or ionized atomic or molecular species. The radiation or particles are directed at the waveguide surface to produce spatially modified regions of the waveguide. The spatial variations of the modified waveguide will be the same as that produced by the optical modification described above and shown in FIG. 1. For a further discussion of the radiation method see an Article by P. G. Kazansky et al, *Optics Letters* 18, 693 (1993), incorporated herein by reference.

The following example is intended to illustrate the nonlinear optical switch of the present invention and should not be construed in limitation thereof:

EXAMPLE 1

Operation of an all-optical logic gate in an "AND" configuration for producing nonlinear optical (NLO) signals in the same waveguide:

A germania doped silica waveguide optically modified to produce second harmonic generation at 532 nm. The waveguide was made of silica doped with about 6 atomic % of germania. The germania was substantially oxidized. Laser light having a 1.06 µm wavelength from a Quantronix Model 416MLQS Nd:YAG was propagated in the waveguide. The laser beam was mode-locked at 76 MHz and Q-switched at 1.2 KHz. The fundamental wavelength was split into two separate beam paths that were incident on the waveguide. The power of the two fundamental beams incident on the waveguide for modification and for testing was approximately 185 and 225 mW, respectively. The power of the second harmonic wavelength incident on the waveguide for modification was approximately 10 mW. The second harmonic wavelength used to modify the waveguide was produced by illuminating a KDP crystal with the fundamental wavelength beam.

For the optical modification process, the fundamental and second harmonic wavelengths were focused and coupled into the waveguide by a prism. Because of the dispersion of the prism, the incident angle of each beam onto the prism were separately controlled to allow coupling into particular waveguiding modes of the film. The first fundamental beam was coupled into the waveguide's zeroth order mode, the second fundamental beam was coupled into the waveguide's first order mode and the second harmonic beam was coupled into the zeroth order mode. When the beams were overlapped both spatially and temporally within the waveguide, a film generated second harmonic signal was detected and grew in the zeroth order mode to a value on the order of 1 nW.

To demonstrate the device's ability to switch, the incident second harmonic beam was blocked because it was only needed for the optical modification process. When both fundamental beams were incident, a film generated second harmonic signal was created and detected. When either one of the fundamental beams was incident alone, a very weak film generated signal was detected with a value approximately 50 times smaller than when both beams were incident.

The so encoded waveguide is incorporated into an optical switch such as shown in FIGS. 2 and 11 and beams 160 and 170, are transmitted to the waveguide 181 in temporal overlap. That is, where pulses of beams 160 and 170 are in temporal and spatial overlap, eg. per FIGS. 4 and 6 hereof, SHG signals are generated as, eg. beam 204 of FIG. 2 which are read as a series of "1" s. Where the pulses of beams 160 and 170 do not have sufficient overlap, only weak SHG signals are generated, eg. as SHG pulses 190 and/or 200, which are read as "0" s. The output beams 204, 190 and 200 are then read as an on-off pulse train. That is, the NLO switch of the invention produces on-off switching such as indicated in FIGS. 7–9, as well as a stream of binary data (on-off) signals in the manner indicated by the resultant output beam 320 shown in FIG. 10.

An advantage of the NLO switch of the present invention is that the waveguide thereof is of amorphous material in the form of, eg. a thin film. Unlike the crystal waveguides of the prior art, the amorphous waveguides of the present invention can readily be incorporated into present-day integrated circuits.

The waveguide of the NLO switch of the present invention is made of amorphous materials that preferably include silica. Thus such waveguide can be made of silica doped with 1–10 at. % and preferably 6 at. % of Germania ($GeO_2$), 1–10 at. % Titania ($TiO_2$) or 1–10 at. % Phosphorus. However, such waveguide can also be made of Germania or Titania within the scope of the invention.

Such waveguide is desirably incorporated in thin films, 0.1–50 and preferably 0.7–5.0 microns thick.

A detector then reads and processes the data signals. The detector can be a photomultiplier (PMT) or a solid state detector, eg. a photodiode, for detecting a signal or lack thereof from said waveguide.

The NLO switch of the present invention employs the phase matching properties of a nonlinear optical waveguide. As described above, phase matching allows efficient production of SHG beams. This switch will occur in periodically modulated materials which have the correct phase matching for a particular switch's logic gate configuration.

In one embodiment of the invention, fundamental input beams that are in two different modes of the same waveguide path are used to generate SHG signals depending on the initial modification of the waveguide. The phase matched SHG signal that is produced comes from a specific combination of these input beams and modified waveguide. Other combinations of beams will not fulfill the phase matching requirement and produce only small amounts of SHG as noted above.

In addition, if the fundamental beams are not temporally coincident in the waveguide, they do not produce a strong phase-matched SHG beam and are thus not detected. If they are temporally coincident, they can produce a strong phase-matched SHG beam, depending on the initial programming of the waveguide.

To produce phase matched SHG in a single channel waveguide which is initially centrosymmetric in nature, requires a modification to make it non-centrosymmetric. This modification occurs through optical processing. Other modes of modification are envisioned to be poling and chemical modification. These processes have the problem that they produce unidirectional changes in the transverse direction of the waveguide.

As discussed above, one mode of the invention is based on the modification of the waveguide material by a combination of optical beams traveling within the waveguide to produce nonlinear optical signals by a number of different combinations of optical beams. That is, per the invention, one can overlap electric fields in the waveguide to produce modifications.

A preferred process for this production includes the illumination of the waveguide by a laser beam having a frequency $\omega$ that is split into two separate beams and another beam having a frequency $2\omega$. The two beams with frequency $\omega$ are sent into two different modes and the beam with frequency $2\omega$ is sent into one of the above two modes or a different mode (eg. the lowest order mode) of the same waveguide path at the same time. The process for the modification is complicated and not fully known. An "AND" gate can be produced by allowing all three beams to be propagated simultaneously (as described in Example 1). The simultaneous combination of electric fields in the waveguide produces a specific grating that produces SHG only when both modes (beams) are present in the waveguide. The presence of either mode alone does not have the correct wavevector to interact with the grating to produce a significant SHG beam.

A primary use envisioned for this device is as an optical switch incorporated into an integrated circuit.

One advantage of the switch of the invention arises from its ability to be produced in an amorphous material. Presently the highest efficiency NLO devices are produced in single crystal materials; however, these materials are very difficult to grow and are very expensive.

Another advantage of the switch of the invention, is that because it is amorphous it can be directly incorporated into present-day electronic circuitry. Amorphous materials can be readily deposited onto present-day integrated circuits. Single crystal materials must be incorporated into an electronic circuit by a manual or robotic insertion. This type of incorporation is time consuming, expensive, and not amenable to mass production.

A further advantage of the switch of the invention is that it is based on silicon technology. The most ubiquitous semiconductor material is silicon. One embodiment of this invention is to utilize silica as the basis for the waveguide. Silica is simply oxidized silicon. Therefore, the primary ingredient for the device is present in over 95% of all integrated circuits in use today.

A still further advantage of the invention is that it is produced in a single channel waveguide. Other electro-optic materials such as the Mach Zender interferometer requires two channels as noted above.

While it is possible to modify waveguides by poling or chemical modification, as noted above, these procedures produce wg modes that are not as versatile as those produced by the method of the present invention. That is, an important embodiment of the present invention is the optical modification of waveguides to produce the required phase-matching conditions as discussed above, e.g. with respect to FIGS. 1 and 2 hereof. The method of the invention for optical modification of a waveguide, can produce exactly the modification required for optimal SHG production. Other novel embodiments of the invention include operating the above waveguide to provide an NLO switch per the invention and the NLO switch itself.

Such NLO switch will allow integrated circuitry to operate at faster rates and to allow, eg. aircraft to communicate, switch, compute, sense, display and respond much faster than state-of-the-art circuitry based on electronics switching. Also per the invention high frequency pulses of laser light can transmit video and audio signals through fiber optics for further processing.

What is claimed is:

1. An NLO switch comprising,
   a) a waveguide (wg), the wg having at least two waveguiding modes at a fundamental frequency ω, one waveguiding mode at a second harmonic frequency 2ω and at least one encoded grating for phase-matched SHG,
   b) means for directing at least two input pulsed laser beams of the same frequency ω into two of said modes to generate an SHG beam when the encoded grating period compensates for the wavevector mismatch between the combined fundamental beams and the generated second harmonic beam.

2. The NLO switch of claim 1 having means for adjusting the spatial and temporal overlap of the pulses of said input beams such that at least a pair of pulses of said input beams have sufficient overlap to output a strong SHG pulse while at least another pair of pulses of said input beams do not have sufficient overlap and output a weak SHG pulse, to emit an on-off SHG signal and act as an NLO switch.

3. The NLO switch of claim 2, having means to output said strong SHG pulse that is 10 to 50× as strong as said weak pulse.

4. The NLO switch of claim 1 having a detector selected from the group consisting of a PMT, a photodiode and a calorimetric detector for detecting a signal from said waveguide.

5. The NLO switch of claim 1 having means for transmitting two input fundamental laser beams with different pulse trains, each beam into a separate one of said modes, wherein at least some of the pulses of each pulse train sufficiently overlap to output reinforced SHG pulses or 1 s and at least some of the pulses of each pulse train, do not have sufficient overlap and output weak SHG pulses or 0 s, to output on-off data signals from said waveguide.

6. The NLO switch of claim 5 wherein said wg is "Y" shaped and each of said fundamental beams is input into a separate branch of said "Y" with said SHG gratings being located at least in the stem of said "Y" shaped waveguide.

7. The NLO switch of claim 1 having means for varying the wavelength of each input beam from 290 nm to 2500 nm.

8. The NLO switch of claim 1 having means for varying the pulse repetition rate from 1 mHz to 1 teraHz.

9. The NLO switch of claim 1 having a wg selected from the group consisting of a planar wg and a channel wg.

10. The NLO switch of claim 1 having a detector selected from the group consisting of a PMT and a photodiode for detecting a signal or lack thereof from said waveguide.

11. The NLO switch of claim 1 having a pulsed laser beam source and a beam splitter which provides said two input beams and a delay line for each of said two input beams to adjust the temporal overlap thereof for input into said wg.

12. The NLO switch of claim 1 having a pulsed laser beam source and means for varying the pulse repetition from 0.001 Hz to 1 teraHz.

13. The NLO switch of claim 1 having means for varying the wavelength of each input laser beam from 200 to 8000 nm.

14. The NLO switch of claim 1 wherein said waveguide is made of doped silica dielectric material.

15. The NLO switch of claim 14 having means to vary the wavelength of each input laser beam from 200 to 2500 nm.

16. The NLO switch of claim 14 wherein the dopant in said silica is selected from the group consisting of germanium, phosphorus and boron.

17. A method for encoding an NLO switch comprising;
   a) directing at least two input pulsed laser beams of the same frequency (ω) into at least two modes of a waveguide (wg) and
   b) concurrectly directing a pulsed input beam of a second harmonic frequency (2ω) into one of said two modes or into a third mode of said wg, all beams being in temporal overlap,
   to form at least one phase-matched grating which produces a strong output SHG beam only when both beams of frequency (ω) are present in two modes of said wg.

18. The method of claim 17 wherein said three input laser beams are divided off a common laser beam and the temporal overlap of said beams is adjusted by means of delay lines applied respectively, to each of said input beams.

19. A method for operating the encoded NLO switch of claim 17 comprising, directing at least two pulsed input beams of the same frequency into said two modes to generate a strong pulsed output SHG beam from said wg in an NLO switching process.

20. The method of claim 19 wherein the spatial and temporal overlap of the pulses of said input beams are adjusted such that at least one pulse of one input beam reinforces an overlapped pulse of the other input beam to output a resultant SHG, on-off signal in an NLO switching process.

21. The method of claim 19 wherein said two input laser beams are divided off a common laser beam and the temporal overlap of said beams is adjusted by means of delay lines applied respectively to each of said two input beams.

22. The method of claim 19 wherein the pulses of said two input laser beams are mode-locked and at least some of the pulses of one input beam are in temporal overlap with at least some of the pulses of the other input beam.

23. The method of claim 19 wherein two input laser beams with different pulse trains are directed, one beam into each of said two modes, wherein at least some of the pulses of each pulse train overlap and reinforce, to output strong SHG signals or 1 s and wherein some of the pulses of each pulse train do not sufficiently overlap and output weak SHG signals or 0 s to output on-off data signals.

24. The method of claim 23 wherein said strong SHG signal is at least 10 times the power of said weak SHG signals.

25. The method of claim 19 wherein the pulse repetition rate of each input beam is varied from 1 mHz to 1 teraHz.

26. The method of claim 19 wherein the wavelength of each input beam is varied from 200 nm to 2500 nm.

* * * * *